United States Patent
Jacobsen et al.

(10) Patent No.: US 8,571,711 B2
(45) Date of Patent: Oct. 29, 2013

(54) MODULAR ROBOTIC CRAWLER

(75) Inventors: Stephen C. Jacobsen, Salt Lake City, UT (US); Marc X. Olivier, Sandy, UT (US)

(73) Assignee: Raytheon Company, Waltham, MA (US)

(*) Notice: Subject to any disclaimer, the term of this patent is extended or adjusted under 35 U.S.C. 154(b) by 1123 days.

(21) Appl. No.: 12/171,146

(22) Filed: Jul. 10, 2008

(65) Prior Publication Data
US 2009/0030562 A1    Jan. 29, 2009

Related U.S. Application Data

(60) Provisional application No. 60/959,108, filed on Jul. 10, 2007.

(51) Int. Cl.
*B62D 55/04* (2006.01)
*G06F 19/00* (2011.01)
*B25J 17/00* (2006.01)

(52) U.S. Cl.
USPC ......... 700/247; 700/245; 180/9.21; 180/9.26; 901/1; 318/568.12

(58) Field of Classification Search
USPC ........ 180/14.1, 14.7, 7.1, 8.6, 9.4, 9.46, 9.26, 180/9.32, 9.34, 182, 183, 184, 185, 186, 9, 180/9.21, 21; 446/69, 71, 79, 85, 94, 436, 446/431, 470; 318/568.12, 568.2; 700/245, 700/247, 249, 250; 901/1; 280/400; 305/15
See application file for complete search history.

(56) References Cited

U.S. PATENT DOCUMENTS

| | | | |
|---|---|---|---|
| 1,107,874 | A | 8/1914 | Appleby |
| 1,112,460 | A | 10/1914 | Leavitt |
| 1,515,756 | A | 11/1924 | Roy |
| 1,975,726 | A | 10/1934 | Martinage |
| 2,025,999 | A | 12/1935 | Myers |
| 2,082,920 | A | 6/1937 | Aulmont |
| 2,129,557 | A | 9/1938 | Beach |
| 2,312,072 | A | 3/1940 | Broadwater |
| 2,311,475 | A | 2/1943 | Schmeiser |
| 2,329,582 | A | 9/1943 | Bishop |
| 2,345,763 | A | 4/1944 | Mayne |

(Continued)

FOREIGN PATENT DOCUMENTS

| | | |
|---|---|---|
| CA | 2512299 | 9/2004 |
| CN | 1603068 A | 4/2005 |

(Continued)

OTHER PUBLICATIONS

Ijspeert et al., "From Swimming to Walking with a Salamander Robot Driven by a Spinal Cord Model" Science, vol. 315, pp. 1416-1419, Mar. 2007.*

(Continued)

*Primary Examiner* — Christine Behncke
(74) *Attorney, Agent, or Firm* — Thorpe North & Western LLP

(57) ABSTRACT

A modular robotic crawler can be formed by intercoupling a selected plurality of segment modules from a preexisting collection of differing compatible segment modules. The segment modules can have at least one intercoupleable interface. The selection can be based on a planned operational scenario of functions to be performed.

25 Claims, 6 Drawing Sheets

(56) References Cited

U.S. PATENT DOCUMENTS

| | | |
|---|---|---|
| 2,701,169 A | 2/1955 | Cannon |
| 2,850,147 A | 9/1958 | Hill |
| 2,933,143 A | 4/1960 | Robinson et al. |
| 2,967,737 A | 1/1961 | Moore |
| 3,037,571 A | 6/1962 | Zelle |
| 3,060,972 A | 10/1962 | Aheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth et al. |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Abdersib |
| 3,565,198 A | 2/1971 | Ames |
| 3,572,325 A | 3/1971 | Bazell et al. |
| 3,609,804 A | 10/1971 | Morrison |
| 3,650,343 A | 3/1972 | Helsell |
| 3,700,115 A | 10/1972 | Johnson et al. |
| 3,707,218 A | 12/1972 | Payne et al. |
| 3,712,481 A | 1/1973 | Harwood |
| 3,715,146 A | 2/1973 | Robertson |
| 3,757,635 A | 9/1973 | Hickerson et al. |
| 3,808,078 A | 4/1974 | Snellman et al. |
| 3,820,616 A | 6/1974 | Juergens |
| 3,841,424 A | 10/1974 | Purcell et al. |
| 3,864,983 A | 2/1975 | Jacobsen |
| 3,933,214 A | 1/1976 | Guibord et al. |
| 3,934,664 A | 1/1976 | Pohjola |
| 3,974,907 A | 8/1976 | Shaw et al. |
| 4,015,553 A | 4/1977 | Middleton |
| 4,051,914 A | 10/1977 | Pohjola |
| 4,059,315 A | 11/1977 | Jolliffe et al. |
| 4,068,905 A | 1/1978 | Black et al. |
| 4,107,948 A | 8/1978 | Molaug |
| 4,109,971 A | 8/1978 | Black et al. |
| 4,132,279 A | 1/1979 | van der Lende et al. |
| 4,218,101 A | 8/1980 | Thompson |
| 4,260,053 A | 4/1981 | Onodera |
| 4,332,317 A | 6/1982 | Bahre et al. |
| 4,332,424 A | 6/1982 | Thompson |
| 4,339,031 A | 7/1982 | Densmore |
| 4,393,728 A | 7/1983 | Larson et al. |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson et al. |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. et al. |
| 4,661,039 A | 4/1987 | Brenholt |
| 4,671,774 A | 6/1987 | Owsen |
| 4,700,693 A | 10/1987 | Lia et al. |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie et al. |
| 4,765,795 A | 8/1988 | Rebman |
| 4,784,042 A | 11/1988 | Painter |
| 4,796,607 A | 1/1989 | Allred, III et al. |
| 4,806,066 A | 2/1989 | Rhodes et al. |
| 4,815,319 A | 3/1989 | Clement et al. |
| 4,815,911 A | 3/1989 | Bengtsson et al. |
| 4,818,175 A | 4/1989 | Kimura |
| 4,828,339 A | 5/1989 | Thomas et al. |
| 4,828,453 A | 5/1989 | Martin et al. |
| 4,848,179 A | 7/1989 | Ubhayakar |
| 4,862,808 A | 9/1989 | Hedgcoxe et al. |
| 4,878,451 A | 11/1989 | Siren |
| 4,900,218 A | 2/1990 | Suthreland |
| 4,909,341 A | 3/1990 | Rippingale et al. |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,977,790 A | 12/1990 | Nishi et al. |
| 5,018,591 A | 5/1991 | Price |
| 5,021,798 A | 6/1991 | Ubhayakar |
| 5,022,812 A | 6/1991 | Coughlan et al. |
| 5,046,914 A | 9/1991 | Holland et al. |
| 5,080,000 A | 1/1992 | Bubic |
| 5,130,631 A | 7/1992 | Gordon et al. |
| 5,142,932 A | 9/1992 | Moya et al. |
| 5,174,168 A | 12/1992 | Takagi et al. |
| 5,174,405 A | 12/1992 | Carra et al. |
| 5,186,526 A | 2/1993 | Pennington |
| 5,199,771 A | 4/1993 | James et al. |
| 5,205,612 A | 4/1993 | Sugden et al. |
| 5,214,858 A | 6/1993 | Pepper et al. |
| 5,219,264 A | 6/1993 | McClure et al. |
| 5,252,870 A | 10/1993 | Jacobsen et al. |
| 5,297,443 A | 3/1994 | Wentz |
| 5,317,952 A | 6/1994 | Immega |
| 5,337,732 A | 8/1994 | Grundfest et al. |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen et al. |
| 5,428,713 A | 6/1995 | Matsumaru |
| 5,435,405 A * | 7/1995 | Schempf et al. ............... 180/9.1 |
| 5,440,916 A | 8/1995 | Stone et al. |
| 5,443,354 A | 8/1995 | Stone et al. |
| 5,451,135 A | 9/1995 | Schempf et al. |
| 5,465,525 A | 11/1995 | Mifune |
| 5,466,056 A | 11/1995 | James et al. |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen et al. |
| 5,672,044 A | 9/1997 | Lemelson |
| 5,697,285 A | 12/1997 | Nappi et al. |
| 5,712,961 A | 1/1998 | Matsuo |
| 5,749,828 A | 5/1998 | Solomon et al. |
| 5,770,913 A | 6/1998 | Mizzi |
| 5,816,769 A | 10/1998 | Bauer et al. |
| 5,821,666 A | 10/1998 | Matsumoto et al. |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen et al. |
| 5,902,254 A | 5/1999 | Magram |
| 5,906,591 A | 5/1999 | Dario et al. |
| 5,984,032 A | 11/1999 | Gremillion et al. |
| 5,996,346 A | 12/1999 | Maynard |
| 6,016,385 A | 1/2000 | Yee et al. |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson et al. |
| 6,162,171 A | 12/2000 | Ng et al. |
| 6,186,604 B1 | 2/2001 | Fikse |

(56) References Cited

U.S. PATENT DOCUMENTS

| | | | |
|---|---|---|---|
| 6,203,126 B1 | 3/2001 | Harguth | |
| 6,260,501 B1 | 7/2001 | Agnew | |
| 6,263,989 B1 | 7/2001 | Won | |
| 6,264,293 B1 | 7/2001 | Musselman et al. | |
| 6,264,294 B1 | 7/2001 | Musselman et al. | |
| 6,281,489 B1 | 8/2001 | Tubel et al. | |
| 6,323,615 B1* | 11/2001 | Khairallah | 318/568.11 |
| 6,325,749 B1 | 12/2001 | Inokuchi et al. | |
| 6,333,631 B1 | 12/2001 | Das et al. | |
| 6,339,993 B1 | 1/2002 | Comello et al. | |
| 6,380,889 B1 | 4/2002 | Herrmann et al. | |
| 6,394,204 B1 | 5/2002 | Haringer | |
| 6,405,798 B1 | 6/2002 | Barrett et al. | |
| 6,408,224 B1 | 6/2002 | Okamoto et al. | |
| 6,411,055 B1 | 6/2002 | Fujita et al. | |
| 6,422,509 B1 | 7/2002 | Yim | |
| 6,430,475 B2 | 8/2002 | Okamoto et al. | |
| 6,431,296 B1 | 8/2002 | Won | |
| 6,446,718 B1 | 9/2002 | Barrett et al. | |
| 6,450,104 B1 | 9/2002 | Grant et al. | |
| 6,477,444 B1* | 11/2002 | Bennett et al. | 700/245 |
| 6,484,083 B1 | 11/2002 | Hayward | |
| 6,488,306 B1 | 12/2002 | Hayward et al. | |
| 6,505,896 B1 | 1/2003 | Boivin et al. | |
| 6,512,345 B2 | 1/2003 | Borenstein et al. | |
| 6,522,950 B1 | 2/2003 | Conca et al. | |
| 6,523,629 B1 | 2/2003 | Buttz et al. | |
| 6,529,806 B1 | 3/2003 | Licht | |
| 6,535,793 B2 | 3/2003 | Allard | |
| 6,540,310 B1 | 4/2003 | Cartwright | |
| 6,557,954 B1 | 5/2003 | Hattori | |
| 6,563,084 B1 | 5/2003 | Bandy et al. | |
| 6,574,958 B1 | 6/2003 | Macgregor | |
| 6,576,406 B1 | 6/2003 | Jacobsen et al. | |
| 6,595,812 B1 | 7/2003 | Haney | |
| 6,610,007 B2 | 8/2003 | Belson et al. | |
| 6,619,146 B2 | 9/2003 | Kerrebrock | |
| 6,636,781 B1* | 10/2003 | Shen et al. | 700/248 |
| 6,651,804 B2 | 11/2003 | Thomas et al. | |
| 6,652,164 B2 | 11/2003 | Stiepel et al. | |
| 6,668,951 B2 | 12/2003 | Won | |
| 6,708,068 B1 | 3/2004 | Sakaue | |
| 6,715,575 B2 | 4/2004 | Karpik | |
| 6,725,128 B2* | 4/2004 | Hogg et al. | 700/245 |
| 6,772,673 B2 | 8/2004 | Seto et al. | |
| 6,773,327 B1 | 8/2004 | Felice et al. | |
| 6,774,597 B1 | 8/2004 | Borenstein | |
| 6,799,815 B2 | 10/2004 | Krishnan et al. | |
| 6,820,653 B1 | 11/2004 | Schempf et al. | |
| 6,831,436 B2 | 12/2004 | Gonzalez | |
| 6,835,173 B2 | 12/2004 | Couvillon, Jr. | |
| 6,837,318 B1 | 1/2005 | Craig et al. | |
| 6,840,588 B2 | 1/2005 | Deland et al. | |
| 6,866,671 B2 | 3/2005 | Tierney et al. | |
| 6,870,343 B2 | 3/2005 | Borenstein et al. | |
| 6,889,118 B2 | 5/2005 | Murray et al. | |
| 6,917,176 B2 | 7/2005 | Schempf et al. | |
| 6,923,693 B2 | 8/2005 | Borgen et al. | |
| 6,936,003 B2 | 8/2005 | Iddan | |
| 6,959,231 B2 | 10/2005 | Maeda | |
| 7,020,701 B1 | 3/2006 | Gelvin et al. | |
| 7,040,426 B1 | 5/2006 | Berg | |
| 7,044,245 B2 | 5/2006 | Anhalt et al. | |
| 7,069,124 B1 | 6/2006 | Whittaker et al. | |
| 7,090,637 B2 | 8/2006 | Danitz et al. | |
| 7,137,465 B1 | 11/2006 | Kerrebrock et al. | |
| 7,144,057 B1 | 12/2006 | Young et al. | |
| 7,171,279 B2 | 1/2007 | Buckingham et al. | |
| 7,188,473 B1 | 3/2007 | Asada | |
| 7,188,568 B2 | 3/2007 | Stout | |
| 7,228,203 B2 | 6/2007 | Koselka et al. | |
| 7,235,046 B2 | 6/2007 | Anhalt et al. | |
| 7,331,436 B1 | 2/2008 | Pack et al. | |
| 7,387,179 B2 | 6/2008 | Anhalt et al. | |
| 7,415,321 B2 | 8/2008 | Okazaki et al. | |
| 7,475,745 B1* | 1/2009 | DeRoos | 180/9.34 |
| 7,539,557 B2 | 5/2009 | Yamauchi | |
| 7,546,912 B1 | 6/2009 | Pack et al. | |
| 7,597,162 B2 | 10/2009 | Won | |
| 7,600,592 B2 | 10/2009 | Goldenberg et al. | |
| 7,645,110 B2 | 1/2010 | Ogawa et al. | |
| 7,654,348 B2 | 2/2010 | Ohm et al. | |
| 7,775,312 B2 | 8/2010 | Maggio | |
| 7,798,264 B2* | 9/2010 | Hutcheson et al. | 180/65.1 |
| 7,843,431 B2 | 11/2010 | Robbins et al. | |
| 7,845,440 B2 | 12/2010 | Jacobsen | |
| 7,860,614 B1 | 12/2010 | Reger | |
| 7,974,736 B2 | 7/2011 | Morin et al. | |
| 8,042,630 B2 | 10/2011 | Jacobsen | |
| 8,162,410 B2 | 4/2012 | Hirose et al. | |
| 8,205,695 B2 | 6/2012 | Jacobsen et al. | |
| 2001/0037163 A1 | 11/2001 | Allard | |
| 2002/0038168 A1 | 3/2002 | Kasuga et al. | |
| 2002/0128714 A1 | 9/2002 | Manasas et al. | |
| 2002/0140392 A1 | 10/2002 | Borenstein | |
| 2002/0189871 A1 | 12/2002 | Won | |
| 2003/0000747 A1 | 1/2003 | Sugiyama et al. | |
| 2003/0069474 A1 | 4/2003 | Couvillon, Jr. | |
| 2003/0097080 A1 | 5/2003 | Esashi et al. | |
| 2003/0110938 A1 | 6/2003 | Seto et al. | |
| 2003/0223844 A1 | 12/2003 | Schiele et al. | |
| 2004/0030571 A1 | 2/2004 | Solomon | |
| 2004/0099175 A1 | 5/2004 | Perrot et al. | |
| 2004/0103740 A1 | 6/2004 | Townsend et al. | |
| 2004/0168837 A1 | 9/2004 | Michaud et al. | |
| 2004/0216931 A1 | 11/2004 | Won | |
| 2004/0216932 A1 | 11/2004 | Giovanetti et al. | |
| 2005/0007055 A1 | 1/2005 | Borenstein et al. | |
| 2005/0027412 A1 | 2/2005 | Hobson et al. | |
| 2005/0085693 A1 | 4/2005 | Belson | |
| 2005/0107669 A1 | 5/2005 | Couvillon, Jr. | |
| 2005/0115337 A1 | 6/2005 | Tarumi | |
| 2005/0166413 A1 | 8/2005 | Crampton | |
| 2005/0168068 A1 | 8/2005 | Courtemanche et al. | |
| 2005/0168070 A1 | 8/2005 | Dandurand | |
| 2005/0225162 A1 | 10/2005 | Gibbins | |
| 2005/0235898 A1 | 10/2005 | Hobson et al. | |
| 2005/0235899 A1 | 10/2005 | Yamamoto et al. | |
| 2005/0288819 A1 | 12/2005 | de Guzman | |
| 2006/0000137 A1 | 1/2006 | Valdivia y Alvarado et al. | |
| 2006/0005733 A1 | 1/2006 | Rastegar et al. | |
| 2006/0010702 A1 | 1/2006 | Roth et al. | |
| 2006/0070775 A1 | 4/2006 | Anhalt et al. | |
| 2006/0117324 A1 | 6/2006 | Alsafadi et al. | |
| 2006/0156851 A1 | 7/2006 | Jacobsen et al. | |
| 2006/0225928 A1 | 10/2006 | Nelson | |
| 2006/0229773 A1 | 10/2006 | Peretz | |
| 2006/0290779 A1 | 12/2006 | Reverte et al. | |
| 2007/0029117 A1 | 2/2007 | Goldenberg et al. | |
| 2007/0156286 A1 | 7/2007 | Yamauchi | |
| 2007/0193790 A1 | 8/2007 | Goldenberg et al. | |
| 2007/0260378 A1 | 11/2007 | Clodfelter | |
| 2007/0293989 A1 | 12/2007 | Norris | |
| 2008/0115687 A1 | 5/2008 | Gal | |
| 2008/0164079 A1 | 7/2008 | Jacobsen | |
| 2008/0167752 A1 | 7/2008 | Jacobsen | |
| 2008/0168070 A1 | 7/2008 | Naphade et al. | |
| 2008/0192569 A1 | 8/2008 | Ray et al. | |
| 2008/0215185 A1 | 9/2008 | Jacobsen et al. | |
| 2008/0272647 A9 | 11/2008 | Hirose et al. | |
| 2008/0284244 A1 | 11/2008 | Hirose et al. | |
| 2009/0035097 A1 | 2/2009 | Loane | |
| 2009/0171151 A1 | 7/2009 | Choset et al. | |
| 2009/0212157 A1 | 8/2009 | Arlton et al. | |
| 2010/0030377 A1 | 2/2010 | Unsworth | |
| 2010/0036544 A1 | 2/2010 | Mashiach | |
| 2010/0201185 A1 | 8/2010 | Jacobsen et al. | |
| 2010/0258365 A1 | 10/2010 | Jacobsen | |
| 2010/0268470 A1 | 10/2010 | Kamal et al. | |
| 2010/0317244 A1 | 12/2010 | Jacobsen et al. | |
| 2010/0318242 A1 | 12/2010 | Jacobsen | |
| 2012/0205168 A1 | 8/2012 | Flynn et al. | |

(56) References Cited

U.S. PATENT DOCUMENTS

FOREIGN PATENT DOCUMENTS

| | | |
|---|---|---|
| CN | 2774717 | 4/2006 |
| CN | 1 970 373 | 5/2007 |
| DE | 3025840 | 2/1982 |
| DE | 3626238 | 2/1988 |
| DE | 3626328 | 2/1988 |
| DE | 19617852 | 10/1997 |
| DE | 19714464 | 10/1997 |
| DE | 197 04 080 | 8/1998 |
| DE | 100 18 075 | 1/2001 |
| DE | 102004010089 | 9/2005 |
| EP | 0 105 418 | 4/1984 |
| EP | 0584520 | 3/1994 |
| EP | 0 818 283 | 1/1998 |
| EP | 0 924 034 | 6/1999 |
| EP | 1 444 043 | 8/2004 |
| EP | 1 510 896 | 3/2005 |
| EP | 1 832 501 | 9/2007 |
| EP | 1 832 502 | 9/2007 |
| FR | 2638813 | 5/1990 |
| FR | 2 850 350 | 7/2004 |
| GB | 1199729 | 7/1970 |
| JP | 52 57625 | 5/1977 |
| JP | 52122431 | 9/1977 |
| JP | S58-032870 | 2/1983 |
| JP | 58-89480 | 5/1983 |
| JP | SHO 58-80387 | 5/1983 |
| JP | 60-211315 | 4/1984 |
| JP | 59139494 | 9/1984 |
| JP | 60015275 | 1/1985 |
| JP | 60047771 | 3/1985 |
| JP | 60060516 | 4/1985 |
| JP | 61-180885 | 5/1985 |
| JP | 60139576 | 7/1985 |
| JP | 62-36885 | 8/1985 |
| JP | 61 001581 | 1/1986 |
| JP | SHO 61-1581 | 1/1986 |
| JP | SHO06-020484 | 2/1986 |
| JP | SHO61-054378 | 3/1986 |
| JP | SHO61-075069 | 4/1986 |
| JP | 61089182 | 5/1986 |
| JP | SHO 61-51353 | 10/1987 |
| JP | SHO 63-32084 | 3/1988 |
| JP | 63306988 | 12/1988 |
| JP | H03-007388 | 1/1991 |
| JP | 04092784 | 3/1992 |
| JP | HEI 5-3087 | 1/1993 |
| JP | 05147560 | 6/1993 |
| JP | HEI05-270454 | 10/1993 |
| JP | HEI 5-286460 | 11/1993 |
| JP | 06-115465 | 4/1994 |
| JP | HEI 8-133141 | 11/1994 |
| JP | 2007-216936 | 8/1995 |
| JP | HEI 7-329837 | 12/1995 |
| JP | HEI 9-142347 | 6/1997 |
| JP | 2003-237618 | 2/2002 |
| JP | 2003-019985 | 1/2003 |
| JP | 2003-315486 | 11/2003 |
| JP | 03 535508 | 6/2004 |
| JP | 2005-081447 | 3/2005 |
| JP | 2005 111595 | 4/2005 |
| JP | 2007-237991 | 9/2007 |
| JP | 2010-509129 | 3/2010 |
| WO | WO 87/02635 | 5/1987 |
| WO | WO97/26039 | 7/1997 |
| WO | WO 00/10073 | 2/2000 |
| WO | WO 02/16995 | 2/2002 |
| WO | WO03/030727 | 4/2003 |
| WO | WO 03/037515 | 5/2003 |
| WO | WO 2004/056537 | 7/2004 |
| WO | WO2005/018428 | 3/2005 |
| WO | WO 2006 068080 | 6/2006 |
| WO | WO 2008/049050 | 4/2008 |
| WO | WO 2008/076194 | 6/2008 |
| WO | WO 2008/135978 | 11/2008 |
| WO | WO 2009/009673 | 1/2009 |

OTHER PUBLICATIONS

Jacobsen, U.S. Appl. No. 12/694,996, filed Jan. 27, 2010.
U.S. Appl. No. 11/985,336, filed Nov. 13, 2007; Stephen C. Jacobsen; office action issued Jun. 14, 2011.
U.S. Appl. No. 12/820,881, filed Jun. 22, 2010; Stephen C. Jacobsen; notice of allowance issued Jun. 9, 2011.
U.S. Appl. No. 12/765,618, filed Apr. 22, 2010; Stephen C. Jacobsen; office action issued Apr. 6, 2011.
U.S. Appl. No. 11/985,320, filed Nov. 13, 2007; Stephen C. Jacobsen; office action issued Apr. 12, 2011.
U.S. Appl. No. 11/985,324, filed Nov. 13, 2007; Stephen C. Jacobsen; notice of allowance issued Apr. 18, 2011.
U.S. Appl. No. 12/151,730, filed May 7, 2008; Stephen C. Jacobsen; notice of allowance issued Apr. 15, 2011.
U.S. Appl. No. 12/694,996, filed Jan. 27, 2010; Stephen C. Jacobsen; Office Action Issued Sep. 30, 2010.
U.S. Appl. No. 12/151,730, filed May 7, 2008; Stephen C. Jacobsen; Office Action Issued Nov. 15, 2010.
U.S. Appl. No. 12/171,144, filed Jul. 10, 2008; Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; ISR Issued Dec. 1, 2010.
U.S. Appl. No. 12/820,881, filed Jun. 22, 2010; Stephen C. Jacobsen; office action issued Nov. 30, 2010.
U.S. Appl. No. 12/171,144, filed Jul. 10, 2008; Stephen C. Jacobsen; office action mailed Jan. 13, 2011.
U.S. Appl. No. 12/694,996, filed Jan. 27, 2010; Stephen C. Jacobsen; office action mailed Jan. 26, 2011.
US PCT Application PCT /US2010/038339; filing date Jun. 11, 2010; Stephen C. Jacobsen; ISR mailed Feb. 9, 2011.
Jacobsen, Stephen, U.S. Appl. No. 11/985,320, filed Nov. 13, 2007.
Jacobsen, Stephen, U.S. Appl. No. 11/985,346, filed Nov. 13, 2007.
Jacobsen, Stephen, U.S. Appl. No. 11/985,324, filed Nov. 13, 2007.
Jacobsen, Stephen, U.S. Appl. No. 11/985,323, filed Nov. 13, 2007.
Jacobsen, Stephen, U.S. Appl. No. 12/171,144, filed Jul. 10, 2008.
Jacobsen, Stephen, U.S. Appl. No. 12/151,730, filed May 7, 2008.
Jacobsen, Stephen, U.S. Appl. No. 12/117,233, filed May 8, 2008.
Jacobsen, Stephen, U.S. Appl. No. 11/293,701, filed Dec. 1, 2005.
Jacobsen, Stephen, U.S. Appl. No. 11/985,336, filed Nov. 13, 2007.
Jacobsen, Stephen, U.S. Appl. No. 12/350,693, filed Jan. 8, 2009.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
U.S. Appl. No. 11/985,320, filed Nov. 13, 2007; Stephen C. Jacobsen; office action mailed Aug. 17, 2011.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.
Nilas Sueset et al., "A PDA-based high-level human-robot interaction" Robotics, Automation and Mechatronics, IEEE Conference Singapore, Dec. 1-3, 2004, vol. 2, pp. 1158-1163.
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.

(56) References Cited

OTHER PUBLICATIONS

Braure, Jerome, "Participation to the construction of a salamander robot: exploration of the morphological configuration and the locomotion controller", Biologically Inspired Robotics Group, master thesis, Feb. 17, 2004, pp. 1-46.

Jacobsen, et al., Advanced intelligent mechanical sensors (AIMS), Proc. IEEE Trandsucers 1991, Jun. 24-27, abstract only, San Fransico, CA.

Jacobsen, et al., "Research robots for applications in artificial intelligence, teleoperation and entertainment", International Journal of Robotics Research, 2004, pp. 319-330, vol. 23.

Jacobsen, et al., "Multiregime MEMS sensor networks for smart structures," Procs. SPIE 6th Annual Inter. Conf. on Smart Structures and Materials, Mar. 1-5, 1999, pp. 19-32, vol. 3673, Newport Beach CA.

MacLean et al., "A digital MEMS-based strain gage for structural health monitoring," Procs. 1997 MRS Fall Meeting Symposium, Nov. 30-Dec. 4, 1997, pp. 309-320, Boston Massachusetts.

Berlin et al., "MEMS-based control of structural dynamic instability", Journal of Intelligent Material Systems and Structures, Jul. 1998 pp. 574-586, vol. 9.

Goldfarb, "Design and energetic characterization of a liquid-propellant-powered actuator for self-powered robots," IEEE Transactions on Mechatronics, Jun. 2003, vol. 8 No. 2.

Dowling, "Limbless Locomotion: Learning to crawl with a snake robot," The Robotics Institute at Carnegie Mellon University, Dec. 1997, pp. 1-150.

Hirose, et al., "Snakes and strings; new robotic components for rescue operations," International Journal of Robotics Research, Apr.-May 2004, pp. 341-349, vol. 23, No. 4-5.

Paap et al., "A robot snake to inspect broken buildings," IEEE, 2000, pp. 2079-2082, Japan.

U.S. Appl. No. 12/765,618, filed Apr. 22, 2010; Stephen C. Jacobsen; office action issued Sep. 20, 2011.

U.S. Appl. No. 12/350,693, filed Jan. 8, 2009; Stephen C. Jacobsen; office action issued Oct. 12, 2011.

U.S. Appl. No. 11/985,320, filed Nov. 13, 2007; Stephen C. Jacobsen; office action issued Nov. 25, 2011.

U.S. Appl. No. 12/814,302, filed Jun. 11, 2010; Stephen C. Jacobsen; office action issued Jan. 10, 2012.

U.S. Appl. No. 11/985,336, filed Nov. 13, 2007; Stephen C. Jacobsen; notice of allowance issued Jan. 19, 2012.

U.S. Appl. No. 12/765,618, filed Apr. 22, 2010; Stephen C. Jacobsen; notice of allowance issued Feb. 2, 2012.

Mehling et al.; A Minimally Invasive Tendril robot for In-Space Inspection; Feb. 2006; The first IEEE/RAS-EMBS International Conference on Biomedical Robotics and Biomechatronics (BioRob '06) p. 690-695.

U.S. Appl. No. 12/350,693, filed Jan. 8, 2009; Stephen C. Jacobsen; office action issued Mar. 28, 2012.

U.S. Appl. No. 11/985,320, filed Nov. 13, 2007; Stephen C. Jacobsen; office action issued Apr. 25, 2012.

U.S. Appl. No. 12/814,302, filed Jun. 11, 2010; Stephen c. Jacobsen; office action issued Apr. 18, 2012.

U.S. Appl. No. 13/481,631, filed May 25, 2012; Ralph W. Pensel; notice of allowance dated Sep. 24, 2012.

U.S. Appl. No. 12/814,302, filed Jun. 11, 2010; Stephen C. Jacobsen; office action dated Nov. 13, 2012.

U.S. Appl. No. 12/117,233, filed May 8, 2008; Stephen C. Jacobsen; office action dated Nov. 23, 2012.

Mehling, et al.; "A Minimally Invasive Tendril Robot for In-Space Inspection"; Biomedical Robotics and Biomechatronis, 2006.

U.S. Appl. No. 12/350,693, filed Jan. 8, 2009; Stephen C. Jacobsen; notice of allowance dated Sep. 20, 2012.

U.S. Appl. No. 13/181,380, filed Jul. 12, 2011; Stephen C. Jacobsen; office action dated Jul. 17, 2012.

U.S. Appl. No. 12/814,302, filed Jun. 11, 2010; Stephen C. Jacobsen; notice of allowance dated Jul. 25, 2012.

U.S. Appl. No. 12/814,304; filed Jun. 11, 2010; Stephen C. Jacobsen; office action dated Apr. 23, 2013.

U.S. Appl. No. 12/117,233; filed May 8, 2008; Stephen C. Jacobsen; office action dated May 6, 2013.

Schenker, et al.; "Reconfigurable robots for all terrain exploration"; 2000, CIT.

PCT/US2013/042739; filed May 24, 2013; Raytheon Company; Search Report dated Aug. 21, 2013.

U.S. Appl. No. 12/117,233; filed May 8, 2008; Stephen C. Jacobsen; office action dated Aug. 15, 2013.

* cited by examiner

MODULAR ROBOTIC CRAWLER

RELATED APPLICATIONS

This application claims the benefit of U.S. Provisional Patent Application No. 60/959,108, filed Jul. 10, 2007, and entitled, "Modular Robotic Crawler," which is incorporated by reference in its entirety herein.

BACKGROUND OF THE INVENTION AND RELATED ART

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

A variety of mobility configurations have been adapted to traverse difficult terrain. These options include legs, wheels, and tracks. Legged robots can be agile, but use complex control mechanisms to move and achieve stability. Wheeled vehicles can provide high mobility, but provide limited traction and generally require width in order to achieve stability. While tracked vehicles can provide a high degree of stability in some environments, tracked vehicles often provide limited maneuverability with very small vehicles. Furthermore, known tracked vehicles are unable to accommodate a wide variety of obstacles, particularly when the terrain is narrow and the paths are tortuous and winding. Accordingly, known mobility configurations tend to be limited in the missions in which they can accomplish.

SUMMARY OF THE INVENTION

Embodiments of the present invention include a modular robotic crawler and methods for tailoring a modular robotic crawler. In one embodiment, a method of tailoring a modular robotic crawler includes selecting a plurality of segment modules from a preexisting collection of compatible segment modules providing differing functionality based on a planned operation scenario of functions to be performed. The modules can be intercoupled together in a series arrangement to form a modular robotic crawler capable of performing the scenario of functions.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

As used herein, the terms "about" and "substantially" means that dimensions, sizes, formulations, parameters, shapes, concentrations, and other quantities and characteristics are not and need not be exact, but may be approximated and/or larger or smaller, as desired, reflecting tolerances, conversion factors, rounding off, measurement error and the like and other factors known to those of skill in the art. The exact degree of deviation allowable may in some cases depend on the specific context.

Numerical data may be expressed or presented in a range format herein. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also to include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Figure 1:
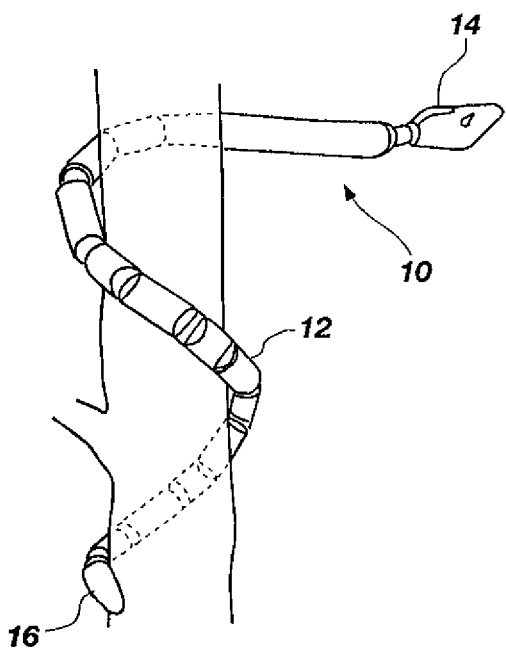
FIG. 1 is a schematic diagram of a modular robotic crawler in accordance with an exemplary embodiment of the present invention.

Turning to FIG. 1, shown is an illustration of a modular robotic crawler. The modular robotic crawler, shown generally at 10, includes a plurality of segment modules linked in a sequential chain. Segment modules can be designated as intermediary segment modules 12 or terminal segment modules, for example, a head module 14 or tail module 16. The modular robotic crawler may include one or more intermediary segment modules.

Figure 2:
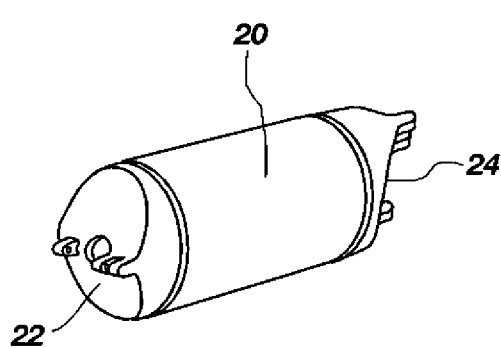
FIG. 2 is a perspective view of an intermediary segment module of a modular robotic crawler in accordance with an embodiment of the present invention.
Figure 3:
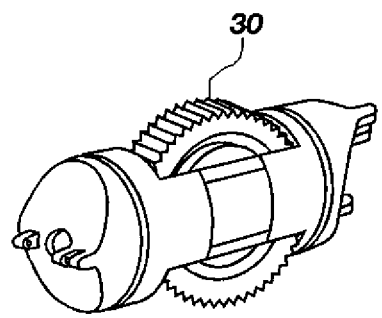
FIG. 3 is a perspective view of an exposed-wheel drive module in accordance with an embodiment of the present invention.
Figure 4:
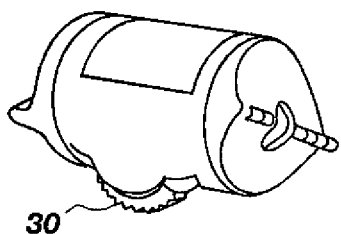
FIG. 4 is a perspective view of an enclosed-wheel module in accordance with an embodiment of the present invention.
Figure 5:
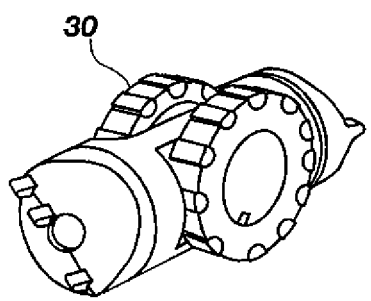
FIG. 5 is a perspective view of an exposed dual-wheel module in accordance with an embodiment of the present invention.
Figure 6:
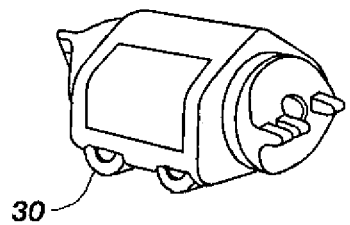
FIG. 6 is a perspective view of a quad-wheel module in accordance with an embodiment of the present invention.
Figure 7:
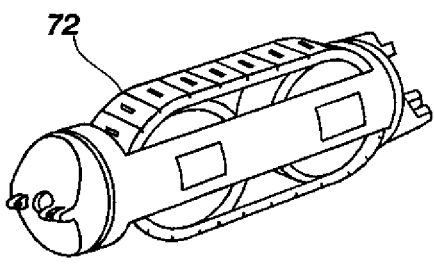
FIG. 7 is a perspective view of an exposed single-track module in accordance with an embodiment of the present invention.
Figure 8:
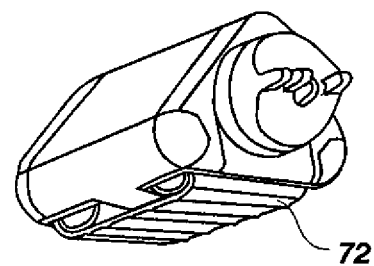
FIG. 8 is a perspective view of an enclosed single-track module in accordance with an embodiment of the present invention.

As shown in further detail in FIG. 2, the intermediary segment modules include a segment body 20, a first coupler 22, and a second coupler 24. The first and second couplers can be positioned at opposite ends of the segment module. The couplers are compatible so that a plurality of intermediary segment modules can be sequentially coupled into an articulated chain to form the modular robotic crawler. Intermediary segment modules may provide varying functions, including for example, locomotion, sensing, manipulation, joints, bending, rotating, extension, and the like, as detailed further below. Joints may be passive or may be actuated.

The modular robotic crawler 10 (FIG. 1) can provide snake-like movement capabilities, although the crawler is not limited to snake-like movements, as will become more apparent from the following discussion. The modular robotic crawler can be designed to provide a small cross section. For example, the segment modules 12, 14, 16 may be designed to have a cross section of about 0.5 inch (about 1.3 cm) to about 2 inches (about 5 cm) in diameter, although other sizes may be used as well. Accordingly, the modular robotic crawler can enter or pass through small openings, such as pipes, vents, wire fencing, and the like. The modular robotic crawler may also be designed to be lightweight, for example, weighing less than about 20 pounds (about 9 kg) or, more particularly, less than about 10 pounds (about 4.5 kg), although other weights may be used as well.

Turning to the segment modules in additional detail, the segment modules may provide various functions including structure, actuation, power, sensing, propulsion, movement, information gathering, interaction, and the like. For example, segment modules can include a propulsion device for moving the modular robotic crawler.

FIGS. 3 through 11 illustrate various types of segment modules that include propulsion devices. Exemplary propulsion devices include wheeled modules, having wheels 30 oriented for longitudinal movement such as an exposed-wheel module (FIG. 3), an enclosed-wheel module (FIG. 4), an enclosed-wheel module (FIG. 5), a quad-wheel module (FIG. 6) and the like. Wheeled modules can provide for efficient and rapid movement on relative smooth and inclined surfaces. When the modular robotic crawler is wrapped around or inside a structure, wheeled modules can also provide for helical motion of the crawler as described further below.

Figure 9:
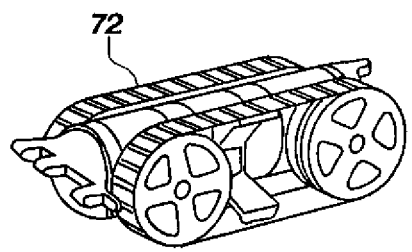
FIG. 9 is a perspective view of an dual-track module in accordance with an embodiment of the present invention.
Figure 10:
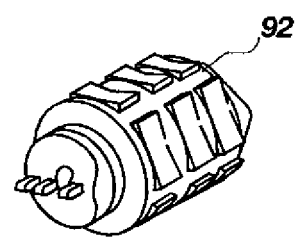
FIG. 10 is a perspective view of an axial rotation module in accordance with an embodiment of the present invention.
Figure 11:
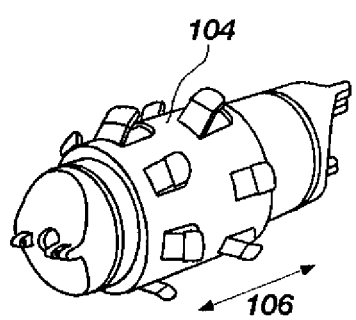
FIG. 11 is a perspective view of an axial reciprocating module in accordance with an embodiment of the present invention.

Other exemplary propulsion devices include tracked modules having a track 72, such as an exposed single-track module (FIG. 7), an enclosed single-track module (FIG. 8), and a dual-track module (FIG. 9). Tracked modules provide similar movements as wheeled modules (e.g., forward, backward, or helical movement), and can function on smooth or rough surfaces. In some situations, tracked modules can provide greater traction than wheeled modules.

Other propulsion devices can also be included. An axial rotation module (FIG. 10) can include an outer rotating sleeve 92 to provide movement over a smooth surface in a direction orthogonal to that of the wheeled or tracked modules illustrated above. An axial reciprocating module (FIG. 11) can include a sleeve 104 which moves in a forward and backward direction 106 to provide a ratchet-like forward motion on some surface types.

A modular robotic crawler can be assembled with segment modules providing more than one type of propulsion device. This can provide increased versatility in the movement modes that can be performed. For example, a modular robotic crawler may include a plurality of segment modules, where at least one segment module provides at least a first propulsion mode and at least one segment module provides at least a second propulsion mode different from the first propulsion mode.

Figure 12:
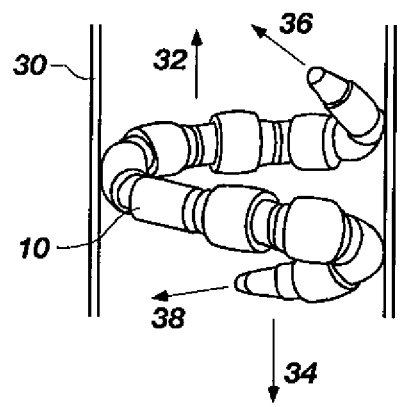
FIG. 12 is a perspective view of a modular robotic crawler wrapped inside a structure and climbing the structure in accordance with an embodiment of the present invention.

As a specific example, a modular robotic crawler can include both wheeled modules and axial rotation modules. This enables the modular robotic crawler to move forward and backward (using the wheeled modules) and to move sideways (using the axial rotation modules). As another example, when wrapped around or inside a structure 30 as illustrated in FIG. 12, a modular robotic crawler 10 can move directly upward 32 or downward 34 using the axial rotation modules and can move helically around and up 36 or down 38 the structure using the wheeled modules.

Figure 13:
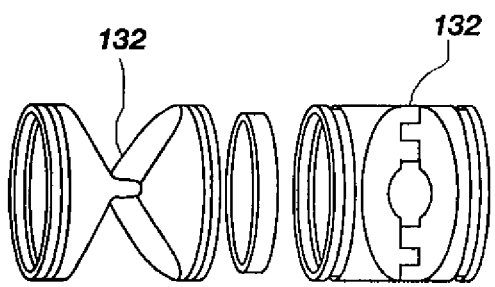
FIG. 13 is a perspective view of a bend joint module in accordance with an embodiment of the present invention.
Figure 14:
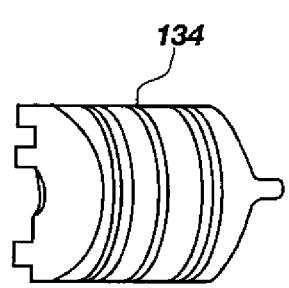
FIG. 14 is a perspective view of a rotator module in accordance with an embodiment of the present invention.
Figure 15:
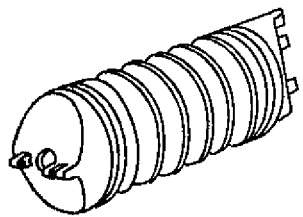
FIG. 15 is a perspective view of a extension module in accordance with an embodiment of the present invention.

Movement and capability of the modular robotic crawler 10 can be enhanced by including intermediary segment modules having joints. For example, FIGS. 13 through 15 illustrate various types of intermediary segment modules that include joints. Joints can be revolute joints, such as bending joints 132 (FIG. 13) to allow in and out of plane movements and to allow complex gaits (e.g. slithering, sidewinder movement, concertina movement, caterpillar like crawling, etc.) and rotating joints 134 (FIG. 14) to allow rotation of modules axially relative to one another (e.g. to orient benders, wheels, tracks, etc. in desired directions). Joints can also be prismatic joints, such as an extension module (FIG. 15) to enable longitudinal extension or retraction and to enable complex gaits. Segment modules may include multiple joints or multiple single joint segment modules may be serially coupled to provide multiple degrees of freedom.

Joints may be passive or may be actuated. For example, passive joints can be positioned based on external forces applied to the joint by adjacent segments. A passive joint can include a locking or ratcheting mechanism, including for example, a break-away clutch. Actuated joints may include actuators which allow the joint position to be controlled. Either type of joint may include joint position, torque, and/or force sensing which can be used for control of the modular robotic crawler in adopting poses or establishing gait.

Figure 16:
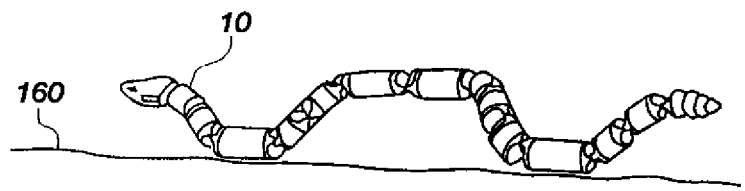
FIG. 16 is a perspective view of a modular robotic crawler moving on a generally flat surface in accordance with an embodiment of the present invention.

By combining various types of joints and propulsion modules, many different types of movement can be performed by a modular robotic crawler. For example, the crawler 10 can adopt a pose that places propulsion devices in contact with a flat or inclined supporting surface 160 for movement over the surface, as illustrated in FIG. 16. When different propulsion devices are available, different movement directions may be achieved depending on which propulsion devices are placed in contact with the supporting surface. Articulated gaits which involve sequentially varying which portions of the modular robotic crawler are placed in contact with the supporting surface can also be achieved.

Figure 17:
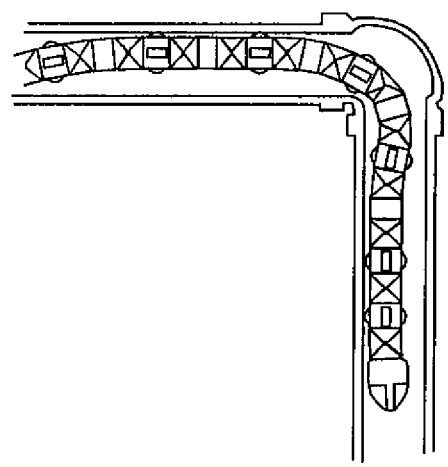
FIG. 17 is a top view of a modular robotic crawler moving through a confined space and around a bend in accordance with an embodiment of the present invention.

As another example, joint positions can be varied to articulate the modular robotic crawler body as it moves to conform to tight confines, such as navigating narrow passages or pipes and turning corners or bends, as illustrated in FIG. 17.

Figure 18:
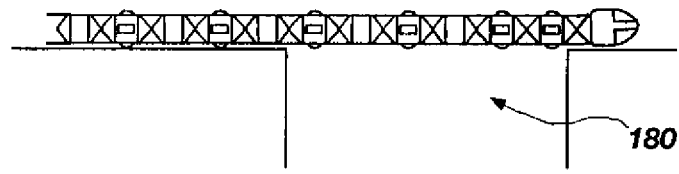
FIG. 18 is a perspective view of a modular robotic crawler cantilevering over a gap in accordance with an embodiment of the present invention.

Stiffness of the joints can be varied as well. For example, by making joints rigid, portions of the body can be cantilevered to allow crossing a gap or deep hole 180 as illustrated in FIG. 18.

Figure 19:
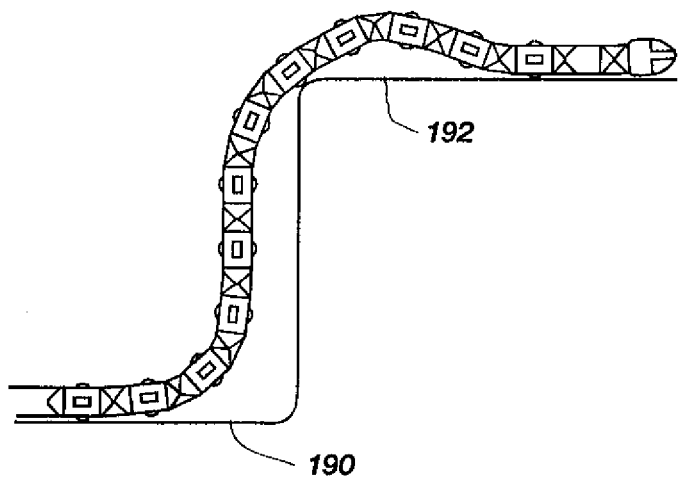
FIG. 19 is a side view of a modular robotic crawler climbing a stair in accordance with an embodiment of the present invention.

By coordinating actuation of bending joints and propulsion devices, complex movement modes are possible. For example, stair climbing can be performed by using a series of articulated movements to transfer load-bearing portions of a crawler from a lower surface 190 to an upper surface 192 as illustrated in FIG. 19. If desired, bucking motions can be performed to help gain traction or help move the crawler into a desired position.

Figure 20:
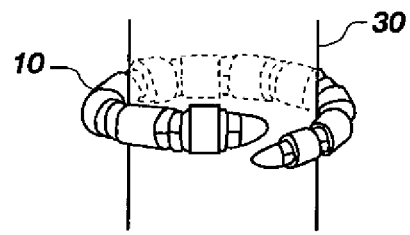
FIG. 20 is a perspective view of a modular robotic crawler wrapped around a structure and climbing the structure in accordance with an embodiment of the present invention in accordance with an embodiment of the present invention.

As mentioned above, the crawler can be wrapped inside a structure (e.g., a pipe, chimney, vent, and the like) to allow movement up or down the structure as illustrated in FIG. 12. The crawler can also be wrapped around the outside of a structure 30 (e.g., a pole or column) to allow climbing up or down the structure as illustrated in FIG. 20.

Other movement modes can include serpentine movement, such as slithering in a snake-like manner and sidewinding by dual orthogonal translating sinusoidal segment actuation. Concertina movement can be achieved by lateral bending, folding, and then extension like an earthworm. Caterpillar-like movement can be achieved by axial rippling, rolling, etc. Various other movement modes are possible as well.

Some movement modes can be described as gravity-effected traction modes, for example, where the modular robotic crawler operates on a gravity-based surface, such as a generally horizontal or slightly inclined surface. In such a case, traction for the propulsion devices can be provided by friction between the propulsion device and the gravity based surface caused by the weight of the serpentine robotic crawler.

Other movement modes can be described as self-effected traction modes, for example, when the serpentine robotic crawler operates on a counter-gravity-based surface, such as vertical pipe or pole. In such a case, traction for the propulsion devices can be provided by the modular robotic crawler by self-effected traction, such as wrapping the modular robotic crawler around the counter-gravity-based surface and squeezing to provide friction between the propulsion device and the counter-gravity-based surface (e.g. inside climbing or outside climbing). Combinations of gravity-effected and self-effected traction may also be used. For example, when traveling in a horizontal pipe, the modular robotic crawler may press portions of the body against an upper surface of the pipe to increases downward force, and thus traction, between other portions of the body and a lower surface of the pipe. While operating, the modular robotic crawler may switch between these traction modes as required by an operational scenario.

In general, the modular robotic crawler may switch between a number of different movement modes as desired to navigate through an environment. For example, an operational scenario may include operating the modular robotic crawler to cross a horizontal field, pass through a chain link fence, enter into a downspout of a building, climb up the downspout onto a roof of the building, climb up and into a vent pipe of the building, climb down the vent pipe into the building, and climb up or down a flight of stairs. Such an operational scenario includes operating the modular robotic crawler in a number of different movement modes and switching between those movement modes when moving from one environment to the next. For example, cross the field may use a concertina type motion, passing through the chain link fence may involve an inch worm type of movement, entering a downspout may involve lifting the front portion of the crawler while the rear portion is moved forward, climbing up a downspout and vent pipe may involve the outside climbing configuration, climbing down a vent pipe may involve the inside climbing configuration, etc.

Segment modules can also include sensors and/or manipulators for interacting with the environment. For example, a sensor can be a camera, a chemical sensor, a biological sensor, an optical sensor, a moisture sensor, a vibration sensor, a temperature sensor, an electromagnetic sensor, a magnetometer, a sound sensor, a force sensor, a pressure sensor, a tactile sensor, a sonar, a radar, a lidar, a radioactivity sensor, a seismic sensor, a sampler, and combinations thereof.

Figure 21:
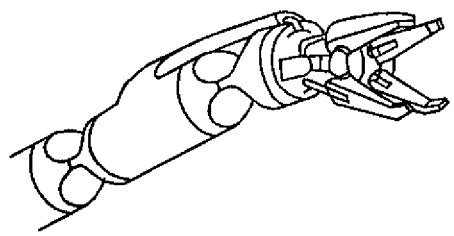
FIG. 21 is a perspective view of a gripper module in accordance with an embodiment of the present invention.
Figure 22:
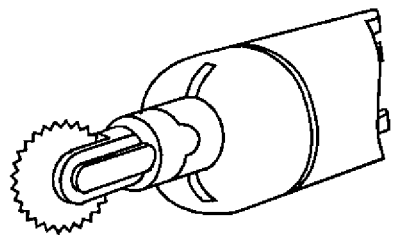
FIG. 22 is a perspective view of a cutter module in accordance with an embodiment of the present invention.
Figure 23:
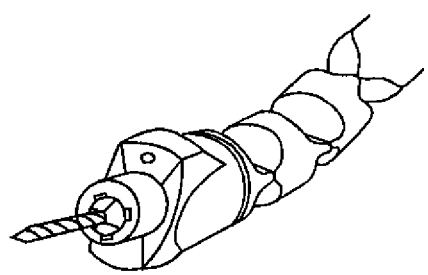
FIG. 23 is a perspective view of a drill module in accordance with an embodiment of the present invention.
Figure 24:
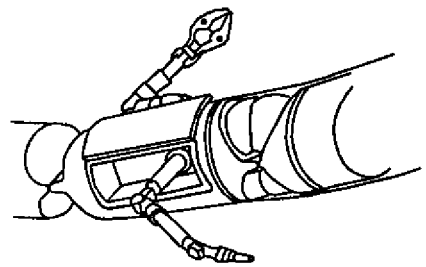
FIG. 24 is a perspective view of a manipulator module in accordance with an embodiment of the present invention.

Various manipulators are illustrated in FIGS. 21 through 23. For example, manipulators can include grippers (FIG. 21), cutters (FIG. 22), and drills (FIG. 23). Manipulators can be disposed on an end segment module, as illustrated in FIGS. 21 through 23, or manipulators can be disposed on an intermediary segment module, as illustrated in FIG. 24.

As another example, a segment module can include a communications module. For example, a communication module can include an optical transceiver, a radio frequency transceiver, an electromagnetic wave transceiver, an acoustic transceiver, and combinations thereof.

Figure 25:
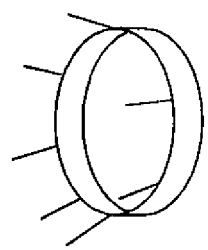
FIG. 25 is a perspective view of a traction ring module in accordance with an embodiment of the present invention.

Segment modules can include coverings for protection from environmental conditions (e.g. dust, mud, water, etc.). Segment modules can also include coverings, traction rings, appendages, or the like to enhance traction, for example, as illustrated in FIG. 25. Spikes, stubs, fibers, hooks, or other similar structures can extend from a segment module to provide an anisotropic friction characteristic. One forward movement mode can use the combination of one or more axial reciprocating modules with one or more modules having anisotropic friction to enable forward movement. Modules can include alternatively extendable and retractable appendages to allow selective engagement or disengagement of the appendages.

In accordance with another embodiment of the present invention, the segment modules can be alternatively attachable and detachable to each other at a coupler portion, and intercompatible so that any segment module can be coupled to any other segment module. For example, the segment modules can include a male coupler at one end and a compatible female coupler at the other end.

In an embodiment, the couplers can include attachment structure designed to allow coupling and uncoupling during operation of the modular robotic crawler. For example, the couplers can be self-coupling and uncoupling, where sufficient force may be applied to couple or uncouple the couplers. As another example, the couplers can include an actuator that allows the couplers to be coupled or uncoupled by operating the actuator.

Couplers capable of being coupled and uncoupled during operation can allow the configuration of the modular robotic crawler to be changed during an operational scenario. Modules may be decoupled and left behind when no longer needed, for example, to help make the crawler smaller or lighter. Examples of types of modules that may be left behind can include propulsion modules that are no longer needed, depleted energy supplies, depleted batteries, empty fuel tanks, etc. As another example, a payload module may be left behind (e.g., an explosive or autonomous sensor).

Segment modules may also be added to the modular robotic crawler during operation. For example, a module left behind by one modular robotic crawler may be picked up by a second modular robotic crawler. As another example, two modular robotic crawlers may be coupled together to form a single modular robotic crawler.

Power may be supplied by one or more segment modules. For example, the power source may be distributed over multiple segment modules. Accordingly, some segment modules may provide power to other segment modules.

In accordance with another embodiment of the present invention, individual segment modules can include their own power source. For example, modules that use power (e.g. actuated joints, propulsion modules, sensor modules, manipulator modules, etc.) may include batteries, fuel cells, engines, or the like to provide energy for operating the module. A segment module having a power source thus provides a self-contained system. One advantage of this embodiment is that the power source scales automatically to increase in capacity as additional modules using power are assembled into a robotic crawler. Accordingly, when assembling the robotic crawler for a particular task, there may be no need to separately configure a power source based on the collection of segment modules being used.

Segment modules may include two or more couplers. For example, a segment module with three couplers may be used to create a branched structure. More particularly, a modular robotic crawler may include a plurality of nodes and branches, where the nodes correspond to an intermediary segment module having three or more couplers, and branches correspond to one or more segment modules coupled together in series. For example, a modular robotic crawler may include a head module, several intermediary modules coupled in series to the head, and then an intermediary module having three couplers. The intermediary module may then be coupled to two tail modules to produce a two-tailed robotic crawler. Many other arrangements can also be formed, including for example rings, tree-like structures, etc.

The modular robotic crawler can include a control system in communications with the segment modules. For example, the control system may be disposed in one or more of the segment modules, and control information routed via a network to other segment modules. The couplers can include compatible signal interfaces to enable communications between coupled segments. Control may be distributed between high-level control functions (e.g., pose and gait generation) and low-level control functions (e.g., local joint control, torque limiting, joint position sensing). Low-level control functions may be provided by local processing capability provided within the segment modules and interconnected through signal interfaces to other segment modules to allow communication with high-level control processing providing in one or more segment modules. As another example, high-level control processing may be performed remotely from the crawler and communicated to the crawler via, for example, a wireless link.

Figure 26:
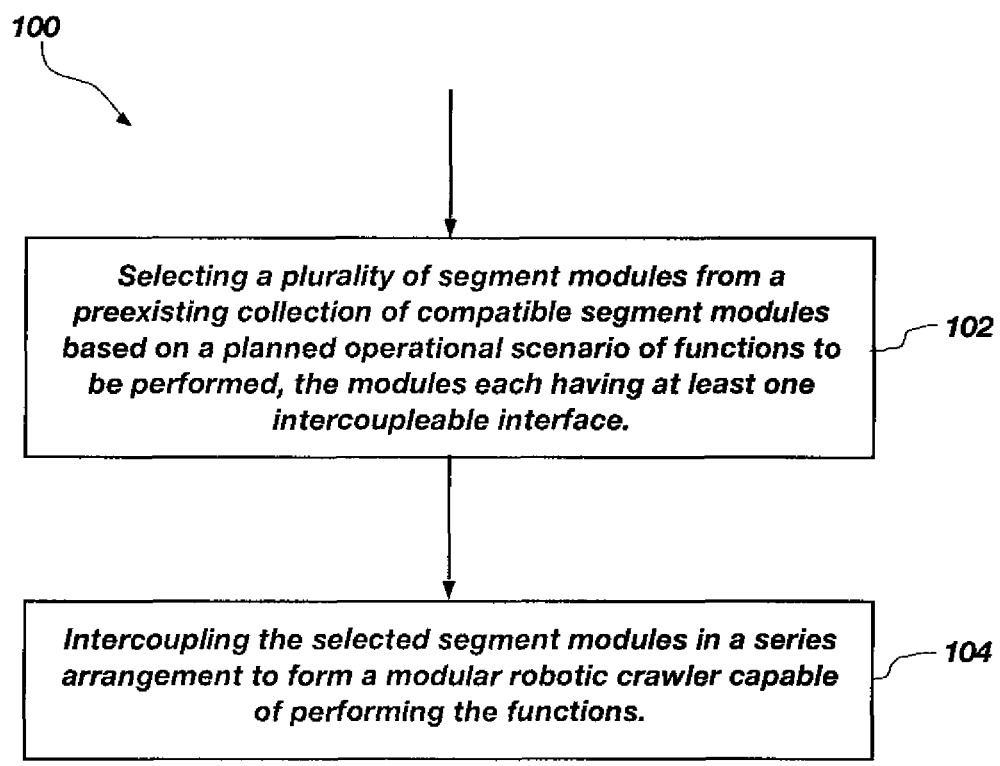
FIG. 26 is a flow chart of a method of tailoring a modular robotic crawler in accordance with an embodiment of the present invention.

A method of tailoring a modular robotic crawler will be described in conjunction with FIG. 26 in accordance with an embodiment of the present invention. The method is shown generally at 100, can include selecting 102 a plurality of segment modules from a preexisting collection of compatible segment modules. The segment modules can be selected based on a planned operational scenario of functions to be performed. For example, particular segment modules having various propulsion devices and joints may be selected to provide specific mobility capability for anticipated terrain, endurance and speed requirements. As another example, specific types of sensing or manipulating modules may be selected to provide anticipated listen, look, cut, repair, and similar functions included within the operational scenario.

The method 100 can also include intercoupling 104 the selected segment modules in a series arrangement to form a modular robotic crawler capable of performing the functions. For example, the modules can be intercoupled using intercoupleable interfaces as describe above. Various numbers of modules can be intercoupled, for example, using a small number (e.g., 2 or 3 modules) or a large number (e.g., 5, 10, 20, or even more modules). Different operational scenarios may involve selecting different unique combinations of segment modules capable of performing the desired functions.

The assembled modular robotic crawler may be operated to perform the desired functions. During operation, additional modules may be coupled to the modular robotic crawler, or modules may be decoupled from the modular robotic crawler, for example, as described above. When multiple movement modes are possible, the modular robotic crawler may be switched between movement modes, for example, as described above.

Summarizing and reiterating to some extent, a modular robotic crawler in accordance with embodiments of the present invention can be assembled from a plurality of interchangeable modules. The characteristics of a modular robotic crawler can be adapted by selecting particular segment module types to allow operating in a variety of environments and performing a variety of preplanned functions. Accordingly, modular robotic crawlers can be useful, including without limitation, for surveillance, reconnaissance, placement and retrieval of items, rescue situations, inspection in hazardous conditions, combat, etc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present: a) "means for" or "step for" is expressly recited in that limitation; b) a corresponding function is expressly recited in that limitation; and c) structure, material or acts that support that function are described within the specification. Accordingly, the scope of the invention should be determined solely by the appended claims and their legal equivalents, rather than by the descriptions and examples given above.

What is claimed is:

1. A method of tailoring a modular robotic crawler to perform a sequence of differing functions, comprising:
    selecting a plurality of segment modules from a preexisting collection of compatible segment modules providing different functionality based on a planned operational scenario of functions to be performed, the modules each having at least one intercoupleable interface, a first segment module having a first propulsion device for providing a first propulsion mode and a second segment module having a second propulsion device different from and independent of the first propulsion device for providing a second propulsion mode different from the first propulsion mode, wherein the first and second segment modules having the first and second propulsion devices, respectively, operate to cause locomotion of the robotic crawler independent of any other segment module and any other propulsion device; and
    intercoupling the selected segment modules in a series arrangement to form a modular robotic crawler capable of performing the scenario of functions.

2. The method of claim 1, further comprising operating the modular robotic crawler to perform the functions.

3. The method of claim 2, further comprising intercoupling at least one additional segment module onto the modular robotic crawler while operating the modular robotic crawler.

4. The method of claim 2, further comprising decoupling at least one segment module from the modular robotic crawler while operating the modular robotic crawler.

5. The method of claim 1, further comprising:
    operating the modular robotic crawler; and
    switching the modular robotic crawler between a first movement mode and a second movement mode.

6. The method of claim 5 wherein the first movement mode is a gravity-effected traction mode for moving the modular robotic crawler along a gravity-based surface and the second movement mode is a self-effected traction mode for moving the modular robotic crawler along a counter-gravity-based surface.

7. A modular robotic crawler system comprising:
    a plurality of segment modules linked in a sequential chain, the plurality of segment modules including at least one intermediary segment module;
    the at least one intermediary segment modules having:
        a segment body,
        a first coupler positioned at a first end of the segment body, and
        a second coupler positioned at a second end of the segment body,
        wherein the first coupler and second coupler are compatible so that a plurality of intermediary segments can be sequentially coupled; and
    wherein a first segment module comprises a first propulsion device for moving the modular robotic crawler, and wherein a second segment module comprises a second propulsion device different from and independent of the first propulsion device, wherein the first and second segment modules having the first and second propulsion devices, respectively, operate to cause locomotion of the robotic crawler independent of any other segment module and any other propulsion device.

8. The modular robotic crawler of claim 7, wherein at least one of the segment modules comprises a joint.

9. The modular robotic crawler of claim 7, wherein at least one of the segment modules comprises an environmental sensor.

10. The modular robotic crawler of claim 9, wherein the environmental sensor is chosen from the group consisting of a camera, a chemical sensor, a biological sensor, an optical sensor, a moisture sensor, a vibration sensor, a temperature sensor, an electromagnetic sensor, a magnetometer, a sound sensor, a force sensor, a pressure sensor, a tactile sensor, a sonar, a radar a lidar, a radioactivity sensor, a seismic sensor, a sampler, and combinations thereof.

11. The modular robotic crawler of claim 7, wherein at least one of the segment modules includes a communications module.

12. The modular robotic crawler of claim 11, wherein the communications module is chosen from the group consisting of an optical transceiver, a radio frequency transceiver, an electromagnetic wave transceiver, an acoustic transceiver, and combinations thereof.

13. The modular robotic crawler of claim 7, wherein at least one of the segment modules is a manipulator module.

14. The modular robotic crawler of claim 7, wherein the segment modules include attachment structure that can be coupled or un-coupled from other modules during operation of the modular robotic crawler.

15. The modular robotic crawler of claim 7, wherein the segment modules each include a power source.

16. The modular robotic crawler of claim 7, further comprising a power source distributed over at least two of the segment modules.

17. The modular robotic crawler of claim 7, wherein the first coupler and the second coupler each comprise compatible signal interfaces to enable communications between coupled intermediary segments.

18. The modular robotic crawler of claim 17, further comprising a control system in communications with the segment modules via the signal interfaces.

19. A modular robotic crawler system comprising:
a plurality of segment modules, the segment modules being alternatively attachable and detachable to each other at a coupler portion and intercompatible so that any segment module may be coupled to any other segment module, the plurality of segment modules, when coupled together, forming a multi-functional modular robotic crawler;
a first segment module having a first propulsion device providing at least a first propulsion mode; and
a second segment module having a second propulsion device different from and independent of the first propulsion device for providing at least a second propulsion mode different from the first propulsion mode, wherein the first and second segment modules having n the first and second propulsion devices, respectively, operate to cause locomotion of the robotic crawler independent of any other segment module and any other propulsion device.

20. The modular robotic crawler of claim 19, wherein at least one segment module provides a sensing capability.

21. The modular robotic crawler of claim 19, wherein at least one of the segment modules is a manipulator module.

22. The modular robotic crawler of claim 19, wherein at least one of the segment modules comprises at least three couplers.

23. The modular robotic crawler of claim 19, wherein the segment modules can be coupled or un-coupled from each other during operation of the modular robotic crawler.

24. The modular robotic crawler of claim 19, wherein the segment modules comprise a signal interface to enable communication between coupled segment modules.

25. The modular robotic crawler of claim 19, further comprising a control system in communications with the segment modules.

* * * * *